March 31, 1925.
T. G. NYE
1,531,305
INCLOSED REEL SPOOL FOR CINEMA FILMS
Original Filed March 6, 1919
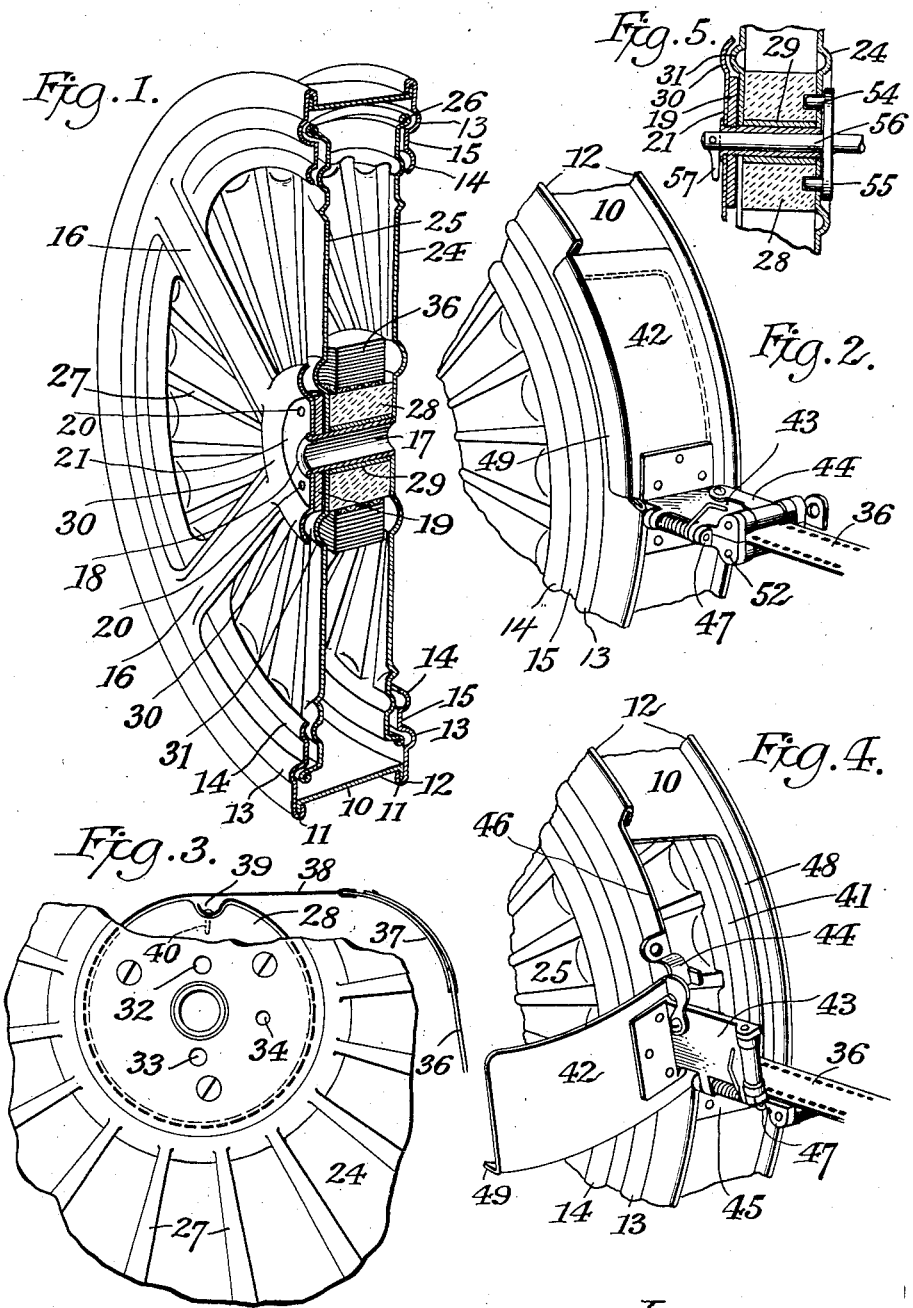

Patented Mar. 31, 1925.

1,531,305

UNITED STATES PATENT OFFICE.

THOMAS GEOFFREY NYE, OF SYDNEY, NEW SOUTH WALES, AUSTRALIA, ASSIGNOR TO NICHOLAS POWER COMPANY, INC., OF NEW YORK, N. Y., A CORPORATION OF DELAWARE.

INCLOSED REEL SPOOL FOR CINEMA FILMS.

Application filed March 6, 1919, Serial No. 280,989. Renewed July 19, 1924.

*To all whom it may concern:*

Be it known that I, THOMAS GEOFFREY NYE, a subject of the King of Great Britain and Ireland, and residing at Film House, Pitt Street, Sydney, New South Wales, Australia, have invented new and useful Improvements in Inclosed Reel Spools for Cinema Films, of which the following is a specification.

This invention relates to reel spools for carrying cinema films. It is constructed of embossed sheet metal and comprises a drum shaped spool casing having a frame cheek which is apertured in sectors and an open cheek which consists only of a ring, a laterally swinging door and a fire trap on the casing rim, and a double cheek film reel rotatably mounted within said casing. It includes certain accessory features, which are hereinafter particularly described with reference to the accompanying drawings, in which Figure 1 is a perspective elevational view on a central vertical section through the reel and spool casing;

Fig. 2 is a fragment external perspective view, showing the access lid and the fire trap on the spool rim, both in closed position;

Fig. 3 is a fragment sectional elevation illustrating the mounting of the reel cheeks on the reel hub, also the film tag, and tommy drive holes in the reel cheek;

Fig. 4 is a perspective view corresponding with Fig. 2, showing the lid and trap in open position, as when starting a film on the reel; and Fig. 5 is a fragment section explanatory of the mounting of the complete reel spool on the driving spindle of a cinema projector.

The spool casing is constructed of a cylindrical rim portion 10 which is outwardly flanged at either edge as shown at 11; the flanges are embraced by the over-beaded edges 12 of the spool cheeks. These cheeks are embossed, the portions adjacent the rim beads 12 being formed as two circular concentric grooves, 13, and 14, with an intervening plain ring portion 15 between them.

The spool cheek on one side is open between its rim portion and its central portion, except where these parts are joined by integral spokes 16, the whole cheek structure being embossed circularly and radially to procure rigidity. The other spool cheek consists of a rim flange only.

The two cheek rims of the casing are identical in section and are seamed to the peripheral flanged ring 10. A tubular spindle 17 is riveted into the central portion of the spoke frame cheek, as shown at 18, the neck portion of this spindle being screwed into a reinforcing disc 19, which is riveted as shown at 20 to the disc like central portion 21 of the spoke frame cheek.

The reel is double sided having its cheeks 24 and 25 formed of pressed sheet metal conformed in section near the peripheral portion to the section of the spool cheeks at 13, 14 and 15, and beaded at its peripheral edges 26 to augment rigidity and minimize risk of grating the edges of the film. Between the circularly embossed peripheral portions and the flat hub portions, the reel cheek plates are embossed to a radial pattern, as shown clearly in all the figures, the salient radial embossments 27 appearing as spokes, which each offer a finger grip to the operator, enabling him to spin the reel in either direction, the sector openings between the spoke portions 16 of the spool casing cheeks offering access for this purpose.

The peripheral portions of the reel cheeks which are disposed adjacent the circularly embossed rim portions 13, 14 and 15 of the spool casing, provide a sinuous clearance space between them, which serves as an effective fire break, and eliminates all risk of fire applied externally finding a way into the interior of the reel, notwithstanding that the reel is rotatable in the spool casing, so that while the spool casing is held in a fixed position, the reel may be freely turned to wind in or deliver out the film.

The hub portion of the reel is constituted of a cylinder 28 which may be of wood, having the disc like central portions of the cheek plates 24 and 25 pinned to it, and enclosing within it a tubular bush 29 adapted to run on the tubular spindle 17 which is carried by the spool casing cheek 21. A fire break is also provided centrally by the sinuous clearance space between the correspondingly embossed portions 30 and 31 of the spool casing cheek and the reel cheek surrounding the flat hub area. These fire break clearance spaces between the spool cheeks and the reel cheeks are sufficiently free to permit the reel to turn without any frictional retardation, but are yet sufficiently close to eliminate any risk of fire passing through them.

The reel cheek plate 24 on the open side of the spool casing is pierced near its centre with a plurality of tommy holes 32, 33, 34, adapted to receive the point or points 54 on a driver disc 55 forming part of the cinema projector, in connection with which the spool reel is used.

Rotational movement applied to the cheek 24 and through it to the hub cylinder 28 turns the reel so as to wind the film thereon. The film 36 is attached at its end to the reel hub by means of a spring clip 37 on the end of a fabric tape 38 the end of which 39 is sunk in a cross slot in the hub cylinder 28 and secured therein by one or more staples 40. This method of securing the tape end 39 permits the tape to be rolled on the hub cylinder 28 in either direction of rotation thereof without producing an inequality in the roll, which might have the effect of deforming the film lying over it.

The rim portion of the spool casing is interrupted in one place to form a hand hatch 41 seen in Fig. 4. Through this hatch the operator gains access to the tape carrier 38 and the clip 37 to attach a new end of film 36 thereto.

The hatch 41 is covered by a segmental laterally swinging lid 42 which is associated with the top leaf 43 of the fire trap; this trap includes a latch 44 and is a well known construction, which forms no part of the present invention. Its lower fixed member 52 is permanently attached by a flange 45 to the rim 10. At that side of the hatch 41 over which the lid 42 swings, the flange bead 12 is cut away, as shown at 46, to offer clearance for the lateral movement of the lid; this lateral movement takes place around the pintle 47 which is part of the fire trap structure.

At the other side of the hatch 41 an edge portion 48 of the plate 10 is maintained within the adjacent rim flange 12, to form a lap or rebate under the edge of the lid 42 when closed. At its outer side, the lid 42 is downwardly flanged, as shown at 49, and this flange, when the lid is closed forms an effective fire break. The open sides of the spool offer facility to the operator to move the reel quite readily by touching the radial flutings, which offer a finger grip and enable him to turn the reel in either direction to increase or diminish tension on the film roll 36. The cheeks 24 and 25 of the reel are centered to offer free working clearance for the film in rolling and unrolling.

This spool reel is characterized by the fact that the film is entirely protected from fire and external contact under all circumstances throughout the whole of its length except that length of a few inches which is located between the fire traps in the delivering and receiving spools in passing through the gate of the projector.

It is further distinguished by the fact that whilst this complete protection by a non-removable metal cover against action of external fire is provided for, the reel is still accessible to the operator for the purpose of turning it, which he may do without opening the lid, and is also accessible for the purpose of entering a new film, which may be readily effected by momentarily swinging aside the lid 42 and securing the end of the new film in the spring clip 37. Maximum facility for changing reels during the course of a performance is offered, and changes may be made very rapidly, as it is necessary only to exchange spool reels and connect up the film end to the empty receiver reel, delay in threading in the film and adjusting the reel in a casing being obviated. The manner of mounting the spool reels on the projector spindles is clearly shown in the section, Fig. 5, where 56 is the projector spindle, and 57 the latch lock by which the spool reel is held on the spindle, so that the film will register laterally in the gate of the projector.

Except when the lid 42 is positively held open, as shown in Fig. 4, access of external fire to the film is impossible and consequently danger of conflagration in use is entirely eliminated; a gate fire will be extinguished in the fire traps through which the film passes.

In use these spool reels will carry the film during transport and storage as well as during use. In the projector the film is drawn from one spool reel and rewound directly on to another spool reel, and exposure of the film for rewinding as is necessary when the reel is removable from the casing is entirely avoided.

I claim:

1. A reel spool for cinema films comprising a double cheek spool casing, a double cheek reel rotatably mounted therein, one cheek of said casing covering only the rim of one cheek of the reel and the other cheek of said casing being apertured between its central and rim areas to expose the other cheek of the reel through said aperture, a lid on the peripheral portion of said casing adapted to cover a hatch affording access to the interior of the reel, and a self-closing fire trap having a folding member associated with said lid.

2. A reel spool for cinema films comprising a double cheek spool casing, a double cheek reel rotatably mounted therein, said casing being formed to expose both cheeks of the reel, a hatch for affording access to the interior of the reel, and a fire trap on the peripheral portion of said casing.

3. A reel spool for cinema films having a film space, a metal casing completely enclosing said space, said casing having open sides, a hatch lid and a fire trap on the peripheral portion of said casing, a double cheek reel rotatably mounted in said casing, and a fire checking joint between the rim portion of said reel and the rim of said casing.

4. A reel spool for cinema films comprising an open sided outer casing having cheeks seamed to its peripheral portion and a hub disc integrally connected with the rim cheek at one side of said casing, a fire trap fixed on the peripheral portion of said casing, a hatch being provided at the periphery of said casing for affording access to the interior of the reel, a flange-edged lid mounted on the folding member of said fire trap, a tubular spindle fixed in said hub disc, and a double cheek reel rotatably mounted on said spindle.

5. A reel spool for cinema films comprising an open sided outer casing having ring cheeks seamed to its peripheral portion and a hub disc integrally connected with the rim cheek at one side of said casing, a fire trap fixed on the peripheral portion of said casing, a hatch being provided at the periphery of said casing for affording access to the interior of the reel, a flange-edged lid mounted on the folding member of said fire trap, a tubular spindle fixed in said hub disc, a double cheek reel rotatably mounted on said spindle, circular grooves formed in the contiguous surfaces of the reel and spool cheeks forming fire checks, and radially disposed embossments on the reel cheeks.

6. In a reel spool of the class described, a double cheek spool casing having an access hatch at its periphery, a narrow cover edge at one side of the hatch, the other side being flush with the spool cheek, a spring operated fire trap adapted to swing across and close said hatch, and a cover lid flange on its rear edge and mounted on the opening element of said fire trap.

7. A reel spool for cinema films comprising a spool casing, a tubular spindle fixed in said casing, a double cheek reel rotatably mounted thereon, said casing being formed to expose one side of the reel hub, cooperating groove flanges and rim portions on said casing and reel, respectively, and a driving member adapted to engage the exposed hub on said reel and impart motion thereto.

8. A reel spool for cinema films comprising a double cheek casing, a double cheek reel, having a hub, rotatably mounted therein, said casing being formed to expose tommy driving holes provided in one side of the reel hub, a spindle extending axially of said reel, a driving element carried by said spindle, and tommy pins on said driving element for engaging with the holes in said hub and imparting rotation thereto.

Signed at New York city, in the county of New York and State of New York, this 9th day of December, 1918.

THOMAS GEOFFREY NYE.